United States Patent [19]

Suzuki

[11] Patent Number: 5,844,226
[45] Date of Patent: Dec. 1, 1998

[54] FILM SCANNER

[75] Inventor: Kenji Suzuki, Kanagawa, Japan

[73] Assignee: Fuji Photo Film Co., Ltd., Kanagawa, Japan

[21] Appl. No.: 813,936

[22] Filed: Mar. 3, 1997

[30] Foreign Application Priority Data

Mar. 4, 1996 [JP] Japan .................................. 8-045832
Mar. 4, 1996 [JP] Japan .................................. 8-045833

[51] Int. Cl.$^6$ .................................................. G06K 07/10
[52] U.S. Cl. ........................... 235/462; 235/439; 235/465
[58] Field of Search ................................ 235/465, 439, 235/462, 469, 480; 356/487, 527, 296; 399/41, 77

[56] References Cited

U.S. PATENT DOCUMENTS

| | | | |
|---|---|---|---|
| 4,120,581 | 10/1978 | Takahashi et al. ........................ | 355/38 |
| 4,203,671 | 5/1980 | Takahashi et al. ...................... | 356/402 |
| 4,629,876 | 12/1986 | Kubota et al. ............................ | 235/473 |
| 4,961,086 | 10/1990 | Takenaka ................................. | 235/462 |
| 5,122,645 | 6/1992 | Saeki et al. ............................. | 235/462 |
| 5,164,574 | 11/1992 | Ujiie et al. ............................... | 235/466 |
| 5,352,876 | 10/1994 | Watanabe et al. ...................... | 235/381 |
| 5,477,353 | 12/1995 | Yamasaki ................................. | 358/487 |
| 5,684,286 | 11/1997 | Pierce ...................................... | 235/454 |
| 5,724,152 | 3/1998 | Hayashi et al. .......................... | 358/296 |

FOREIGN PATENT DOCUMENTS

| | | | |
|---|---|---|---|
| 52-156624 | 12/1977 | Japan ............................. | G03B 27/72 |
| 52-156625 | 12/1977 | Japan ............................. | G03B 27/72 |
| 1-219730 | 9/1989 | Japan ............................. | G03B 27/46 |
| 1-219731 | 9/1989 | Japan ............................. | G03B 27/46 |

*Primary Examiner*—Donald T. Hajec
*Assistant Examiner*—Thien Minh Le
*Attorney, Agent, or Firm*—Sughrue, Mion, Zinn, Macpeak & Seas, PLLC

[57] ABSTRACT

A film scanner uses three color line sensors which scan a filmstrip line after line over the entire width of the filmstrip, while the filmstrip is fed in a lengthwise direction. While the filmstrip moves forward, photometric data is detected from the filmstrip at a lower pixel density through the line sensors with constant charge storage times. Frame number bar codes and edge positions of respective frames on the photo film are derived from the photometric data, and image data pick-up ranges of the respective frames are determined based on the frame number bar codes and the frame edge positions. Based on the photometric data, color video images simulating photo-prints of the frames are displayed with framing lines that indicate the image data pick-up range of each frame. The framing lines are manually adjustable to correct the image data pick-up range. While the filmstrip moves backward, three color image data is detected from the image data pick-up ranges at a higher pixel density through the line sensors with variable charge storage times that are determined for each frame based on the photometric data of each frame.

23 Claims, 8 Drawing Sheets

FIG. 5

| FRAME NO. | LEADING EDGE POSITION | | TRAILING EDGE POSITION | | FRAMING LINE ADJUSTMENT DATA | CHARGE STORAGE TIME | PRINTING CONDITION CORRECTION AMOUNT |
|---|---|---|---|---|---|---|---|
| | REFERENCE FRAME | FILM ADVANCE AMOUNT | REFERENCE FRAME | FILM ADVANCE AMOUNT | | | |
| .. | .. | .. | .. | .. | .. | .. | .. |
| 12 | 12A | 48 | 11A | 56 | 0,0,-1,1 | 8594,102 | 0,0,0,0 |
| .. | .. | .. | .. | .. | .. | .. | .. | ns
FILM SCANNER

BACKGROUND OF THE INVENTION

1. Field of the Invention

The present invention relates to a film scanner for scanning a photographic image recorded on a photo film, to detect three color image data. More particularly, the present invention relates to a film scanner which uses line sensors to achieve a high resolution scanning at a low cost.

2. Background Arts

In a conventional film scanner, a photo film, e.g. a negative film, the operator observes the position of each frame on the film within a film carrier, prior to start scanning the image of each frame. An image area sensor has conventionally been used for scanning the image. First the image is roughly scanned to detect three color image data at a low pixel number per frame for use as control data for a main scanning. Then the main scanning is made to detect three color image data at a higher pixel number per frame, i.e., with a higher resolution. The main scan data is sent to a digital printer or an external data recording device. Data for displaying a video image simulating a consequent print or exposure control data for calculating a print-exposure amount in a photo-printer is derived from the main scan data by thinning.

To achieve a high resolution in the above conventional film scanner, the image area sensor must be able to scan millions of pixels or more. Such a high resolution image area sensor needs a large size chip, and the yield can be low, so that the price is very high. In addition, there is a limit in improving the image quality by increasing the pixel number. Since the position of each frame should be confirmed immediately before the scanning of that frame, the work efficiency of the conventional film scanner is low.

To avoid the above described disadvantages of the image area sensor, it is possible to use a line sensor or line sensors for the film scanner. However, there are problems in adopting the line sensors to a film scanner:

(1) How can be a sufficient dynamic range obtained?

(2) How can be photometric areas discriminated in the photo film as being moved relative to the line sensor during the photometry?

(3) How can be a sufficient workability obtained? etc.

SUMMARY OF THE INVENTION

The present invention is made to solve the above and other problems, and has an object to provide a film scanner which uses line sensors so as to automatically and continuously scan a plurality of photographic images at a low cost but with a high resolution.

To achieve the above object, according to the invention, a film scanner for scanning color photo film having a plurality of frames recorded thereon is comprised of:

three color line sensors which make prescanning for detecting photometric data from the photo film under predetermined photometric conditions, and main scanning for detecting three color image data from the photo film;

a moving device for moving the photo film relative to the line sensors twice in a sub scan direction perpendicular to a primary scan direction of the line sensors, first for the prescanning and second for the main scanning; and a photometric condition modifying device for modifying photometric conditions of the line sensors for each frame during the main scanning in accordance with the photometric data of each frame detected through the prescanning.

According to a preferred embodiment, a film scanner for scanning photo film having a plurality of frames recorded thereon, is comprised of:

three color line sensors which make prescanning for detecting photometric data from the photo film under predetermined photometric conditions at a predetermined pixel density, and main scanning for detecting three color image data from the photo film at a higher pixel density than the prescanning;

a moving device for moving the photo film relative to the line sensors twice in a sub scan direction perpendicular to a primary scan direction of the line sensors, first for the prescanning and second for the main scanning;

a photometric condition modifying device for modifying photometric conditions of the line sensors for each frame during the main scanning in accordance with the photometric data of each frame detected through the prescanning;

a frame edge detection device for detecting edges of each frame based on the photometric data;

a frame position determination device for determining respective frame positions on the photo film based on frame edge detection signals from the frame edge detection device;

an image data pick-up range determination device for determining an image data pick-up range of each frame based on the frame position determined by the frame position determination device;

a display device for displaying color video images simulating photo-prints of the respective frames based on the photometric data, and for displaying marks indicating the image data pick-up range on each of the color video images; and a correcting device for correcting the image data pick-up range for each frame by adjusting positions of the marks relative to each color video image on the display device in accordance with manually entered adjustment data.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limitative of the present invention, wherein like reference numerals designate like or corresponding parts throughout the several views, and wherein:

FIG. 5 is an explanatory view of an example of data written in a memory of the system controller;

DETAILED DESCRIPTION OF THE PREFERRED EMBODIMENT

Figure 1:
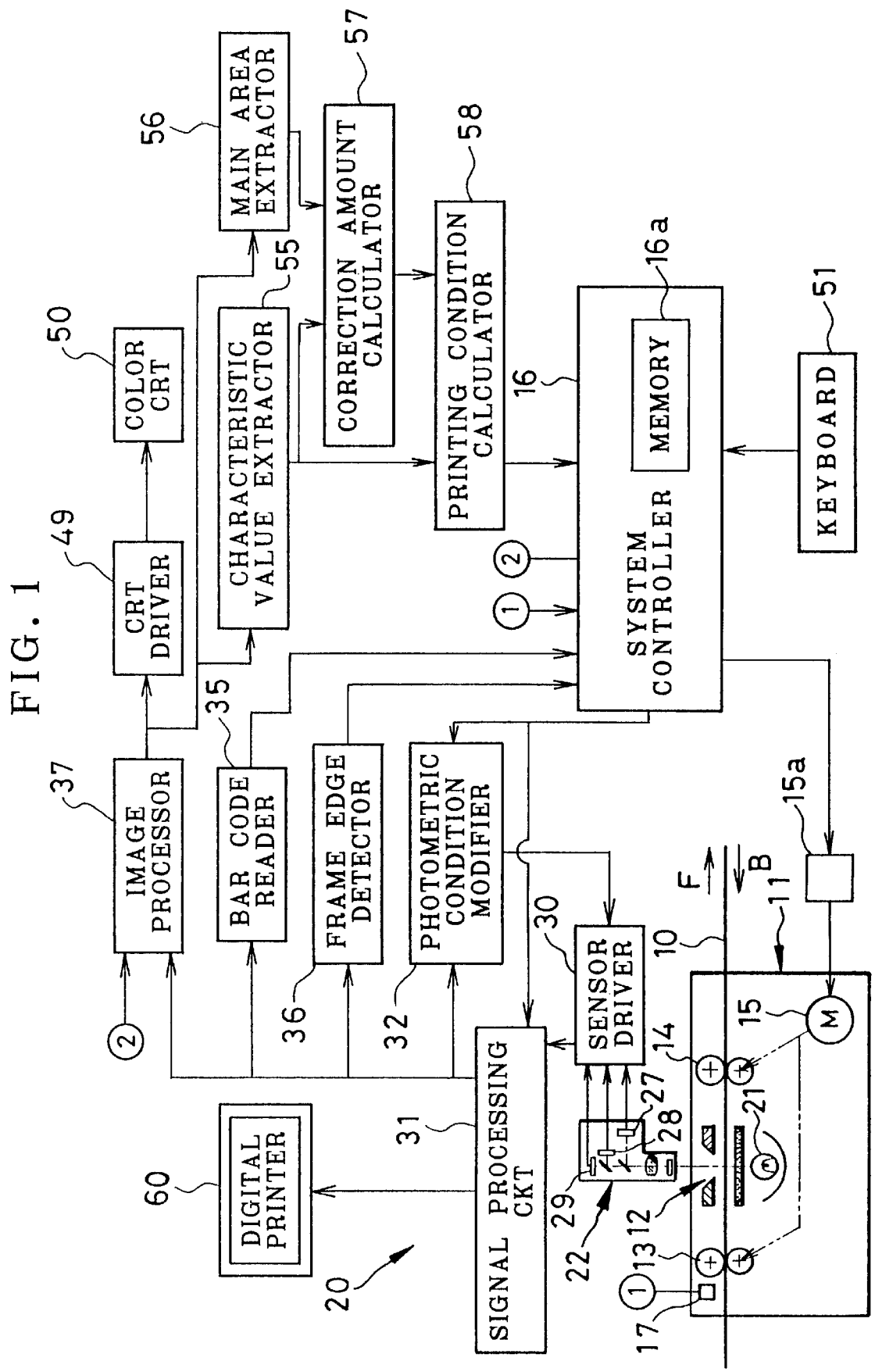
FIG. 1 is a block diagram of a film scanner according to an embodiment of the invention.

In FIG. 1, a developed negative filmstrip 10 is set in a film carrier 11. The film carrier 11 is provided with a photometric stage 12 defined by an aperture, and feed roller pairs 13 and 14 disposed on opposite sides of the photometric stage 12. The feed roller pairs 13 and 14 are rotated bi-directionally by a pulse motor 15 to move the negative filmstrip 10 back and forth. The rotational direction and the speed of the pulse motor 15 are controlled via a motor driver 15a by a system controller 16. The filmstrip 10 is inserted from the side of the feed roller pair 13, so that a film sensor 17 is disposed in proximity to the feed roller pair 13, to detect a film leading end detection signal. In response to the film leading end detection signal, the system controller 16 starts driving the pulse motor 15 to rotate in a forward direction, so the filmstrip 10 is fed in a forward direction shown by an arrow F.

The film sensor 17 also detects a film trailing end detection signal. Based on the film trailing end detection signal and other data, the system controller 16 determines when to stop driving the pulse motor 15, and when to start driving the pulse motor 15 in the opposite direction to feed the filmstrip 10 in a backward direction shown by an arrow B. The system controller 16 sequentially controls respective elements of a scanner main section 20, including a photometric unit 22, such that a prescanning is carried out while the filmstrip 10 is fed in the forward direction F, and a main scanning is carried out while the filmstrip 10 is fed in the backward direction B.

Figure 2:
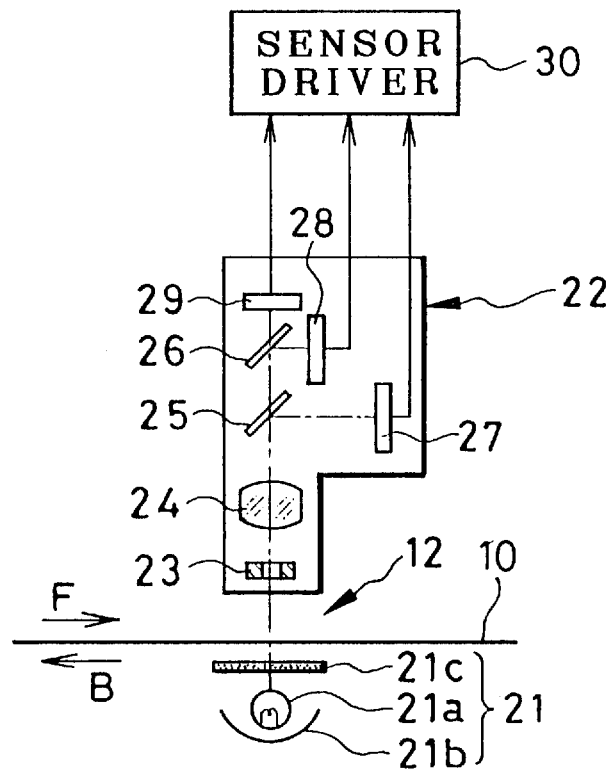
FIG. 2 is a schematic diagram of a photometric unit of the film scanner of FIG. 1.

As shown in detail in FIG. 2, a light source 21 is disposed across the photometric stage 12 from the photometric unit 22. The light source 21 is constituted of a lamp 21a, a reflector 21b and a diffusion plate 21c. The photometric unit 22 is constituted of a light gate 23, an image forming lens 24, dichroic mirrors 25 and 26 and three photoreceptive line sensors 27, 28 and 29 for measuring light amounts of three colors (R, G and B). The dichroic mirrors 25 and 26 are reflective interference filters, each of which is made of a glass plate with dielectric multi-layered coating formed by vacuum deposition. The refraction factor and the thickness of the coating are selected to provide appropriate spectral characteristics for color separation. Thus, the light from the image forming lens 24 is separated into three color beams.

The photometric unit 22 is designed to scan the filmstrip 10 line after line that extend in a direction perpendicular to the lengthwise or feeding direction of the filmstrip 10. The photometric unit 22 is driven to scan each line synchronously with the feeding of the filmstrip 10. Hereinafter, the direction of one line will be referred to as a primary scan direction, whereas the feeding direction of the filmstrip 10 will be referred to as a sub-scan direction. Each line sensor 27 to 29 has 3,600 pixels, so that the line sensors 27 to 29 can scan the entire width of the filmstrip 10 at 3,600 pixels per line in the primary scan direction. In this embodiment, each line sensor 27 to 29 is a CCD (charge coupled device), but the line sensors 27 to 29 may be CMOS type. As shown in FIG. 1, the line sensors 27 to 29 are individually driven through a sensor driver 30. The photometric data of each color is sent to a signal processing circuit 31.

During the forward feeding, i.e. during the prescanning, the signal processing circuit 31 thins the photometric data from the photometric unit 22. Specifically, every 20 adjacent pixels is grouped, and the photometric data of each group is averaged by each color. Thus, the photometric data of 3,600 pixels per line is converted into photometric data of about 180 pixels per line. Correspondingly, the pixel number in the sub-scan direction, i.e. the line density, can be low in the prescanning, so that the filmstrip 10 is fed at a high speed. As a result, prescan data of 180 pixels per line×260 lines is obtained for each color by the prescanning of an unit area of the filmstrip 10 that is defined by the length of one frame and the entire width of the filmstrip 10.

On the other hand, during the main scanning, the filmstrip 10 is fed at a lower speed to increase the pixel number in the sub-scan direction, for example, up to the same pixel density as in the primary scan direction. The signal processing circuit 31 selects photometric data of those pixels which are contained in an image data pick-up range of each frame, among from the photometric data of the photometric unit 22, and outputs it as three color image data to an external device such as a digital printer 60 or an image data recording device. The image data pick-up range is determined frame by frame based on the prescan data, as will be described in detail below. For example, if the filmstrip 10 is ISO 135-type, the image data pick-up range is sized about 22 mm×34 mm, so that three color image data of 2,200×3,400 pixels primary scan×sub-scan) is obtained from the image data pick-up range as a result of main scanning of one unit area of the filmstrip 10.

The photometric points should not be limited to seven per line. As he number of photometric points increases, the higher accuracy of the edge detection is achieved, but the longer processing time is necessary. As the number of photometric points decreases, the processing time becomes the shorter, but the edge detection accuracy is lowered.

Figure 3:
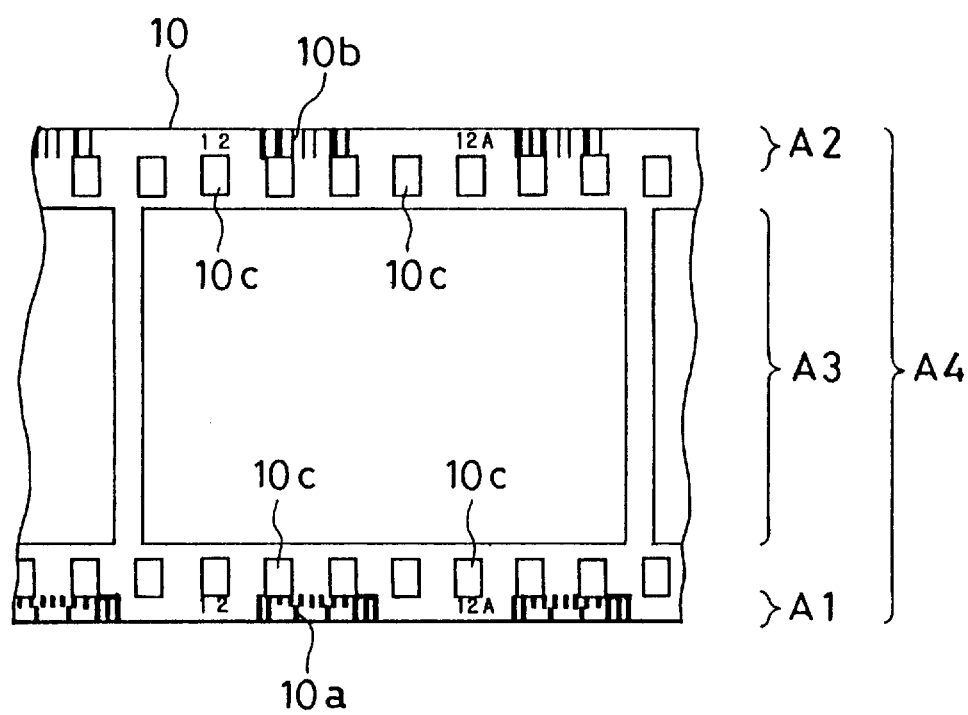
FIG. 3 is a fragmentary view of a photo film, illustrating photometric areas of the photometric unit.

Referring to FIG. 3, the signal processing circuit 31 selects those photometric data pieces among from the prescan data, which are detected from side zones A1 and A2 of the filmstrip 10 where DX bar codes 10b and frame number bar codes 10b are provided. The photometric data pieces of the side zones A1 and A2 are sent to a bar code decoder 35. Those photometric data pieces of the prescan data which are detected from an image recording zone A3 of the filmstrip 10 are sent to a photometric condition modifier 32 and a frame edge detector 36. The signal processing circuit 31 also sends all the prescan data, i.e. the photometric data of the entire width A4, to an image processor 37.

The frame edge detector 36 detects frame edge position signals from the prescan photometric data from the photometric unit 22. Specifically, the frame edge detector 36 selects several photometric points, e.g. seven photometric points, per line at regular intervals in the main scan direction, to detect density variations at the respective photometric points along the sub-scan direction. The density variations are compared with a film base density, to detect a leading edge and a trailing edge of each frame as positions where the densities of the photometric points steeply change. The frame edge detection signals are sent from the frame edge detector 36 to the system controller 16. In addition to the density variations, a unit length to advance the filmstrip 10 by one frame is taken into account for the frame edge detection, thereby to improve the accuracy of the frame edge detection. The unit length or one-frame advance length is determined based on film type data included in each DX code that is decoded by the bar code decoder 35 with reference to a memory 16a that is included in the system controller 16.

As for 135-type filmstrip, as shown in FIG. 3, the DX bar codes 10a and the frame number bar codes 10b are formed on the opposite sides of the image recording zone A3 from each other and outside perforations 10c, as well known in the art. The bar codes 10a and 10b are spaced at regular intervals, such that usually two DX codes 10a and two frame number bar codes 10b are allocated to one frame. Each bar code 10a or 10b is provided with a start code bar and an end code bar on its opposite ends in the feeding or lengthwise direction of the filmstrip 10. The start code bar and the end code bar have different lengths from each other in the feeding direction, so that it is possible to discriminate the direction of the bar codes 10a and 10b, and thus decode the bar codes 10a and 10b with ease in either direction F or B of the film feeding. Data code bars are disposed between the start code bar and the end code bar.

The bar code decoder 35 decodes the DX bar code 10a and the frame number bar code 10b based on the photometric data of the side zones A1 and A2 that is sent from the signal processing circuit 31, and detects start code of each bar code. The decoded bar code data is sent to the system controller 16. The system controller 16 determines based on the DX code data the film type and the available frame number of the filmstrip 10, with reference to a look up table stored in a memory 16a that shows a relationship between the DX code and the film type as well as the available frame number of each film type. The film type data is used for print condition calculation, as will be described later. The available frame number data is utilized for detecting the end of prescanning, so as to start main scanning when the number of frames having been prescanned reaches the available frame number. The available frame number data is also utilized for format selection in displaying all frames of one filmstrip 10 on a color CRT 50, as will be described later. The DX bar code 10a and the frame number bar code 10b may be decoded according to a conventional method such as disclosed in JPA 1-219730 and JPA 1-219731.

Figure 4:
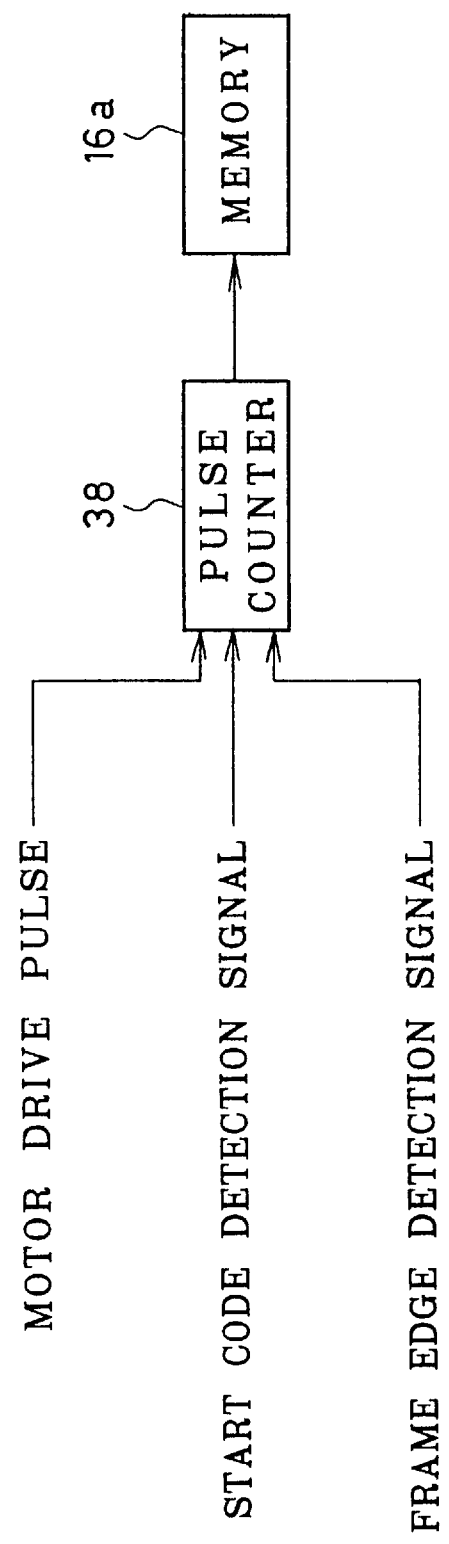
FIG. 4 is a functional block diagram illustrating a frame position determination in a system controller of the film scanner.

The system controller 16 determines the edge positions of each frame based on the frame edge detection signals, frame number bar code detection signals and the number of motor drive pulses applied to the pulse motor 15. FIG. 4 illustrates the edge position determination in the system controller 16. The number of motor drive pulses is counted by a pulse counter 38 that is included in the system controller 16. During the prescanning, the pulse counter 38 is reset to zero and starts counting each time a leading edge detection signal is output from the frame edge detector 36. Thereafter when a start code of a succeeding frame number bar code is detected, the count of the pulse counter 38, i.e. the number of motor drive pulses counted from the detection of the leading edge to the detection of the start code of the succeeding frame number bar code during the film advance in the forward direction F, is written as a film advance amount in the memory 16a. Concurrently, in association with the count or the film advance amount, the frame number represented by this frame number bar code is stored as a reference frame number in the memory 16a, as shown in FIG. 5.

In the same way, a not-shown second pulse counter is reset to zero and starts counting upon a trailing edge detection signal from the frame edge detector 36, and when a start code of a succeeding frame number bar code is detected, the count is written as a film advance amount in the memory 16a, as shown in FIG. 5. The combination of a motor drive pulse number with a reference frame number is used as frame position data for identifying and positioning each frame during the main scanning.

The frame position data is stored in a memory location of the memory 16a that is addressed with a frame number, as shown in FIG. 5. During the main scanning, the counter 38 starts counting the motor drive pulses each time a start code of a frame number bar code representative of a reference frame number is detected. When the count reaches the drive pulse number written in association with the reference frame number in the memory 16a, the system controller 16 determines that the leading edge of the frame associated with the reference frame number is placed in front of the photometric unit 22. It is to be noted that "the leading" is with respect to the forward direction F. Also, the trailing edge of each frame with respect to the forward direction F is determined in the same way during the main scanning. Indeed there is a time lag from the actual passage of the start code bar through the photometric unit 22 to the recognition of the start code, but the length of the time lag is previously known, so that the time lag is cancelled by an appropriate correction. Thus, it is possible to collate the frame edge positions between the main scanning and the prescanning.

The charge storage time of each line sensor 27 to 29 is fixed during the prescanning, but is changed during the main scanning frame by frame in accordance with the prescan photometric data of the corresponding frame. During the main scanning, the sensor driver 30 changes charge storage times of the line sensors 27 to 29 in accordance with output signals from the photometric condition modifier 32. The photometric condition modifier 32 extracts those data pieces which represent a frame of photographic image from the prescan photometric data of the image recording zone A3, with reference to the edge detection signals from the frame edge detector 36, and determines a charge storage time for each color based on the derived data pieces.

Specifically, the charge storage times Ti of the line sensors 27 to 29 for the main scanning are calculated according to the following equation:

$$Ti = Tdpi \times 10^{DDi}$$

wherein
i represents R, G or B;
Tdpi represents an ideal charge storage time for a standard negative frame; and
DDi represents a difference between an average transmittance density of an original frame to be printed and an average transmittance density of the standard negative frame.

Since the line sensors 27 to 29 of the photometric unit 22 are driven to pick up the original frame with the charge storage times Ti on the main scanning that are determined based on the three color average transmittance densities of the original frame derived from the prescan data, the color densities of the original frame do not adversely affect the main scan image data. On the contrary, any original frame can be picked up in a proper photometric dynamic range. Thereby, even though the original frame is over-exposed or under-exposed, the image data from the photometric unit 22 can be processed under the same condition as the image data of the normally exposed standard negative frame.

Figure 6:
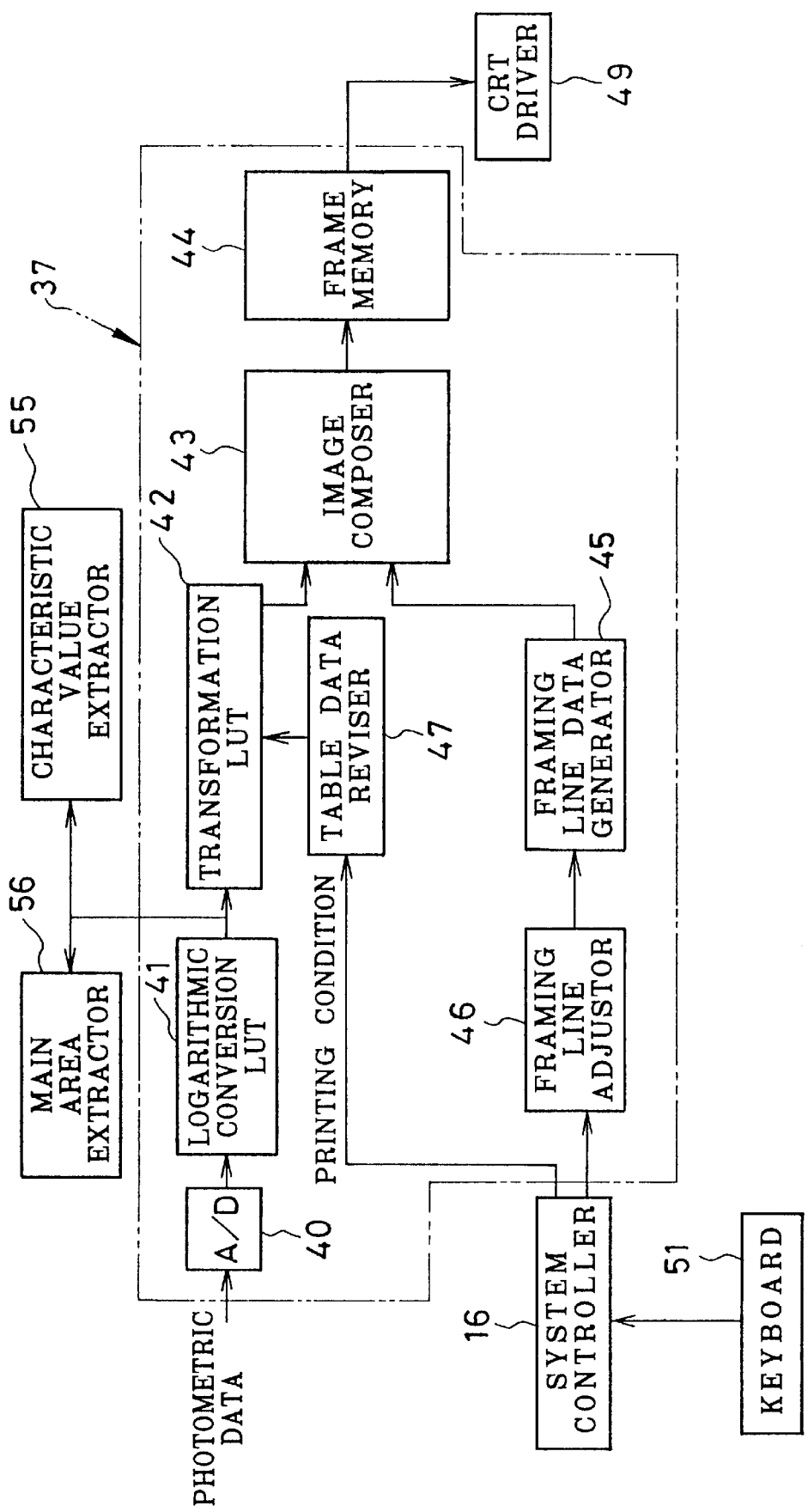
FIG. 6 is a functional block diagram of an image processor of the film scanner.

As shown in FIG. 6, the image processor 37 takes the prescan photometric data from the signal processing circuit 31 synchronously with the film feeding, and converts the data from an analog form into a digital form through an A/D converter 40. Then the digital data is converted via a logarithmic conversion LUT 41 into photometric density signals or photometric gain values that represent logarithmic values of light quantity. The density signals are subjected to a negative-to-positive conversion, and color and density correction in a transformation LUT 42. The processed photometric data representative of three color densities is written in a frame memory 44 of a monitoring system through an image composer 43.

Figure 7A:
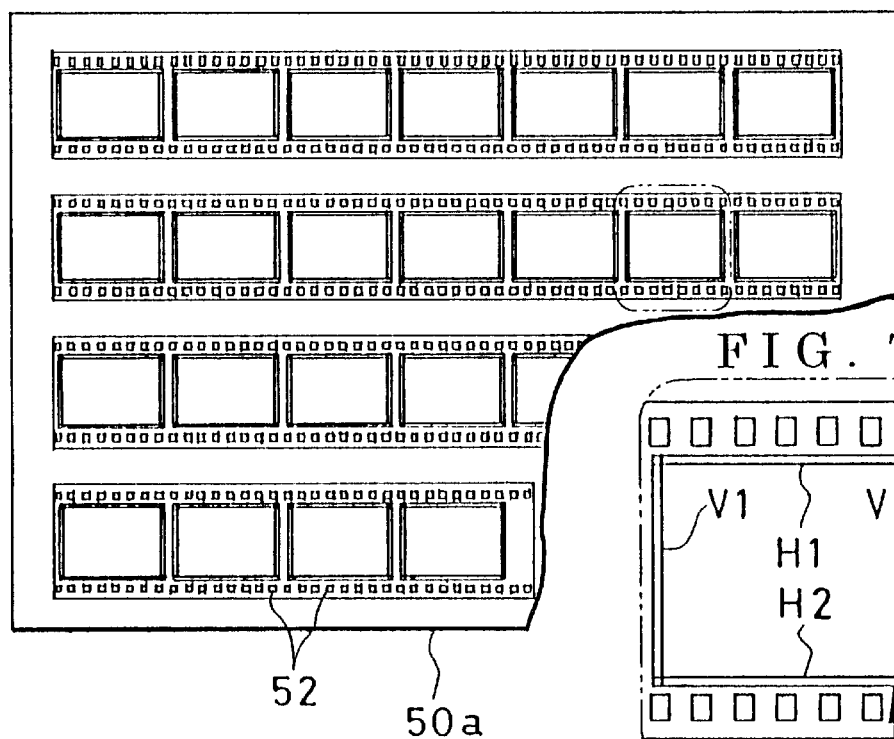
FIG. 7 is an example of video image displayed on a color CRT, simulating photo-prints of all frames on a strip of photo film.
Figure 7B:
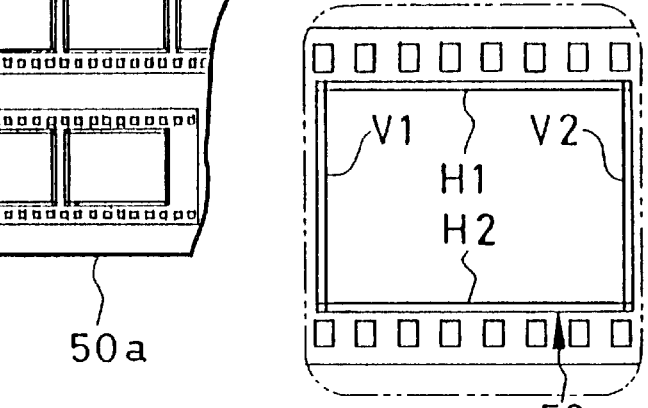

The data in the frame memory 44 is sent to the color CRT 50 through a CRT driver 49, to display a positive video image of each frame based on the prescan photometric data in a real time fashion. The color CRT 50 can displays all frames of one filmstrip 10 together, as is shown in FIG. 7. For this purpose, several display formats are predetermined in accordance with the length or the available frame number of each film type. One of the predetermined display formats is selected based on the DX code data, and the data is written in the frame memory 44 in accordance with the selected display format.

FIG. 7 shows an example of display screen 50a on the color CRT 50 containing all frames of the filmstrip 10 at the end of the prescanning. In this case, video image frames 52 are displayed one after another in rows on the color CRT 50 in the real time fashion, that is, as the prescanning proceeds. Instead of displaying all frames of one filmstrip, the color CRT 50 can display a limited number of, e.g. three, video image frames 52 at once, as shown by a display screen 50b in FIG. 8. Moreover, it is possible to display a single video image frame 52 as shown by a display screen 50c in FIG. 9. The operator can select the display format through a key board 51.

Figure 8:
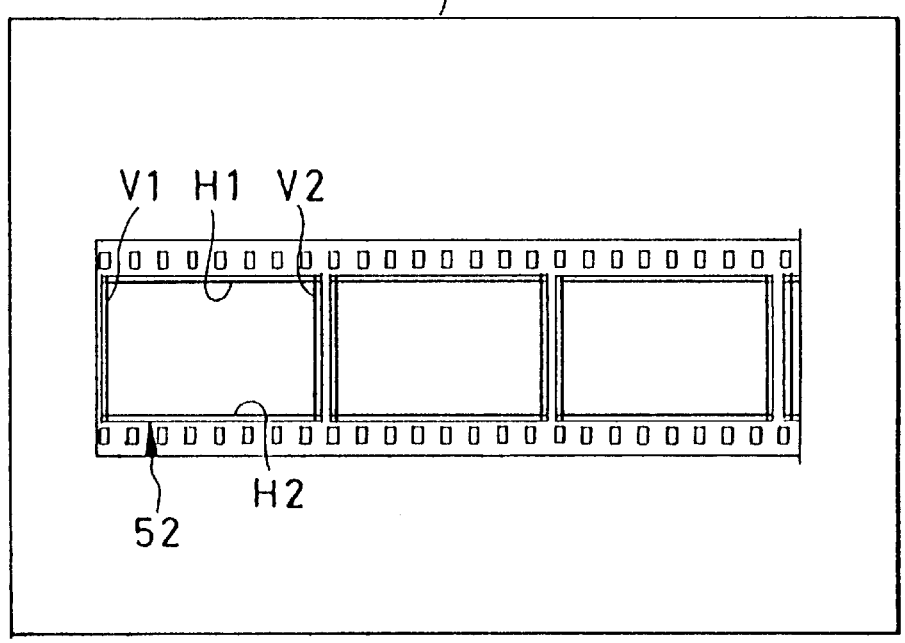
FIG. 8 is an example of video image displayed on the color CRT, simulating photo-prints of three frames.
Figure 9:
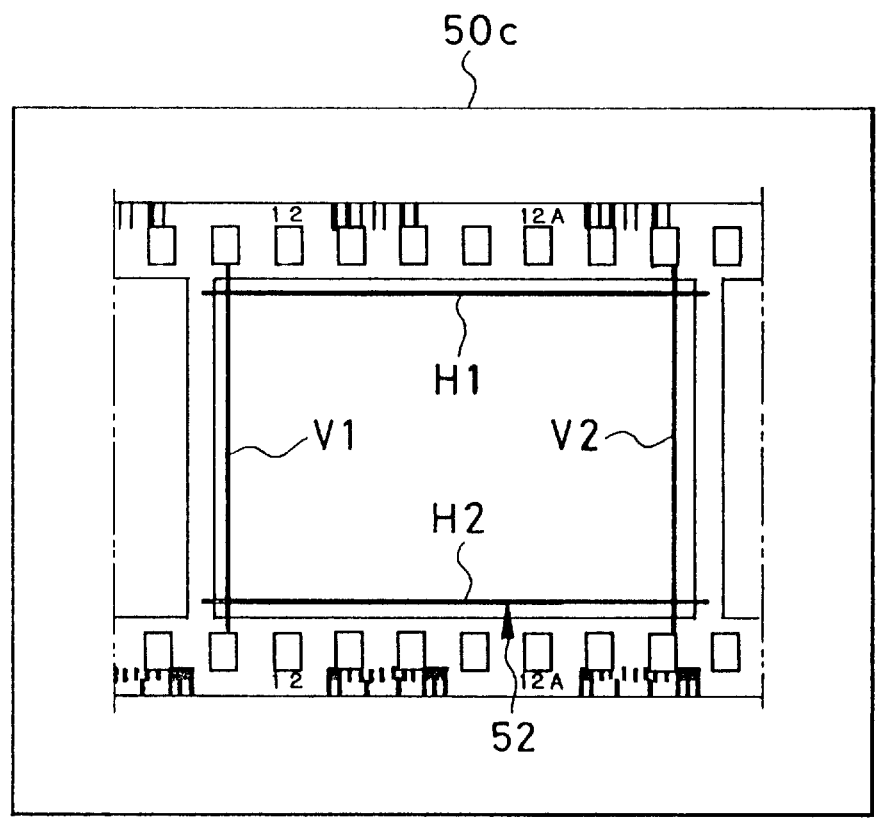
FIG. 9 is an example of video image displayed on the color CRT, simulating a photo-print of a single frame.

As shown in FIG. 6, the image processor 37 further includes a framing line data generator 45 and a framing line adjustor 46. The framing line generator 45 generates data for displaying framing lines V1, V2, H1 and H2 on each video image frame 52, to frame or border the image data pick-up range within each frame. The framing line data is sent to the image composer 43, to be composed with the data from the transformation LUT 42. Thus, the framing lines V1, V2, H1 and H2 are displayed on each video image frame 52 on the color CRT 50, as shown in FIGS. 7 to 9. The positions of the framing lines V1, V2, H1 and H2 relative to the video image frame 52 are determined based on the frame edge detection signals. For this purpose, the system controller 16 has a mode for designating the size and location of image data pick-up range. In this mode, the size of the image data pick-up range and the spacing from the leading edge are designated for the individual frame of the filmstrip 10. Instead of this designation mode, it is possible to previously store a variety of image data pick-up range sizes and locations in accordance with the film types, so as to select appropriate size and location automatically or manually.

The data in the transformation LUT 42 is revised through a table data reviser 47. The table data reviser receives printing condition data from a printing condition operator 58 through the system controller 16, and write the transformation LUT 42 with table data in correspondence with the printing conditions. Printing conditions are determined as follows:

In the image processor 37, the three color photometric data of the image recording zone A3 is sent from the logarithmic conversion LUT 41 to a characteristic value extractor 55 and a main area extractor 56, as is shown in FIG. 6. The characteristic value extractor 55 converts the photometric data into 20×30 pixels per frame by averaging, and then extracts characteristic values from the converted data, including a large area transmittance density (LATD), a maximum density, a minimum density and an average density of each color among these 20×30 pixels. These characteristic values are sent to an ACCS operator 57 and the printing condition operator 58, wherein ACCS stands for Advanced Computerized Color Scanner, a stationary computerized automatic negative image inspection system.

The main area extractor 56 determines a main area of the original frame based on the three color image data f the image recording zone A3 that is sent from the image processor 37. To determine a main area, for example, those ranges of the three color image data which correspond to a fresh color range are predetermined, so that the pixels that belong to the fresh color range are extracted as fresh color pixels, as disclosed for example in JPA 52-156624 and JPA 52-156625. The three color image data of each extracted pixel is inspected in view of other points, so as to extract a lump of fresh color pixels as the main area. The data representative of the extracted main area is sent to the ACCS operator 57. The ACCS operator 57 calculates printing condition correction amounts from image characteristic values of the main area pixels by use of an appropriate formula that is selected in accordance with the result of pattern discrimination of each frame. The printing condition correction amounts are sent to the printing condition operator 58.

The printing condition operator 58 determines basic printing conditions based on the three color LATD from the characteristic value extractor 55 by use of a well known printing condition calculation formula. Then, the printing condition operator 58 corrects the basic printing conditions with the printing condition correction amounts from the ACCS operator 57, to provide the printing conditions. The printing condition correction amounts from the ACCS operator 57 corrects density failure or color failure of the frame with accuracy. In addition, it is possible to determine printing conditions based on the image characteristic values of the main area.

The printing conditions thus determined are sent via the system controller 16 to the table data reviser 47 of the image processor 37. Since the table data reviser 47 rewrites the transformation LUT 42 with the table data corresponding to the printing conditions, the video image displayed on the color CRT 50 simulates an automatically corrected image that will be obtained under the printing conditions. The operator can observe the simulation image on the color CRT 50, to monitor whether the automatically determined printing conditions are proper or not. The operator can enter correction amounts to each frame through the key board 51, according to the result of the observation.

Figure 10:
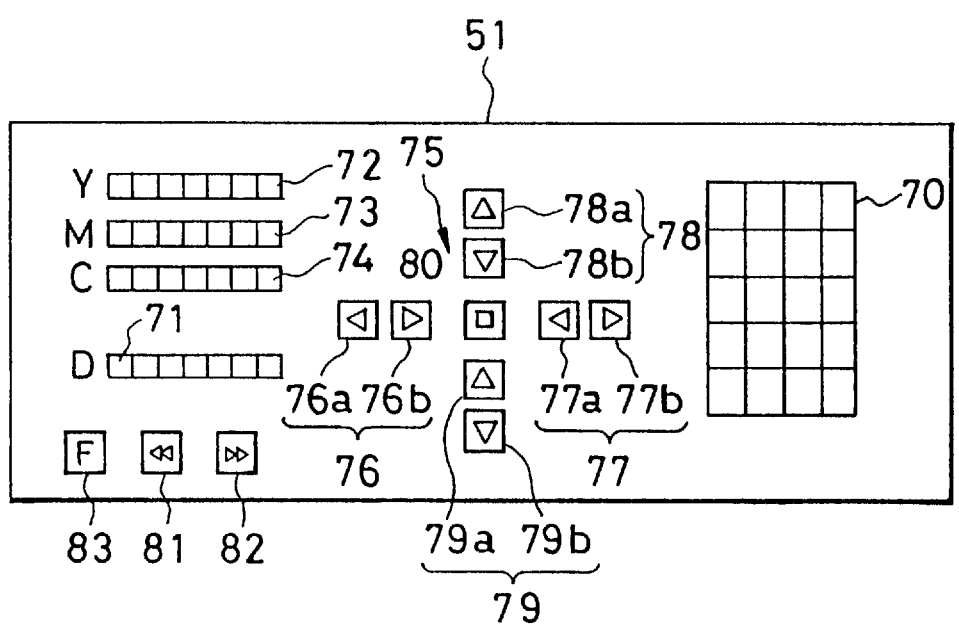
FIG. 10 is a plan view of a key board connected to the system controller.

As shown in FIG. 10, the key board 51 is provided with alphanumeric keys 70, density correction keys 71, color correction keys 72 to 74 and framing line adjustment keys 75. Each group of these correction keys 71 to 74 consists of seven keys in this embodiment, to permit entering seven different correction amounts for each printing condition correction factor: density (D), yellow (Y), magenta (M) and cyan (C). The entered correction amounts are sent via the system controller 16 to the table data reviser 47, so that the table data is rewritten in accordance with the entered correction amounts. In this way, the video image of each frame is corrected in accordance with the entered correction amounts. If it is determined in view of the video image that the corrected printing conditions are proper, a decision key 80 is operated to write the entered correction amounts as final correction amounts for each frame in the memory 16a of the system controller 16, as shown in FIG. 5. If the video image is still improper in density or in color balance, an appropriate correction amount is entered through the key board 51.

The framing line adjustment keys 75 include left and right vertical line adjustment keys 76 and 77, and upper and lower horizontal line adjustment keys 78 and 79. The left vertical line adjustment keys 76 consist of a left shift key 76a and a right shift key 76b. While the left shift key 76a or the right shift key 76b is depressed, the left vertical framing line V1 moves left or right, respectively. In correspondence with the movement of the left vertical framing line V1, the framing line data is revised. In the same way, the right vertical line adjustment keys 77 consist of a left shift key 77a and a right shift key 77b, to move the right vertical framing line V2 left and right. The upper horizontal line adjustment keys 78 consist of an up-shift key 78a and a down-shift key 78b, to move the upper horizontal framing line H1 up and down. The lower horizontal line adjustment keys 79 consist of an up-shift key 79a and a down-shift key 79b, to move the upper horizontal framing line H2 up and down. The operation of the framing line adjustment keys 75 is transmitted to the framing line adjustor 46 through the system controller 16, so that the framing line adjustor 46 changes the framing line data generated from the framing line data generator 45. Thus, one or more of the framing lines V1, V2, H1 and H2 is relocated in correspondence with the operation of the framing line adjustment keys 75. The decision key 80 is operated to fix the positions of the framing lines V1, V2, H1 and H2. At that time, if any of the framing lines V1, V2, H1 and H2 are adjusted, the amount of adjustment is converted into a motor drive pulse number, and is written as framing line adjustment data in the memory 16a, as shown in FIG. 5. Instead of converting the adjustment amount into the number of motor drive pulses, it is possible to convert it into the number of pixels.

Frame designation keys 81 and 82 are provided for designating one frame to adjust its framing lines V1, V2, H1 and H2 among from the all frames displayed on one screen as shown in FIG. 7. The color of framing lines V1, V2, H1 and H2 of the designated frame changes to be distinctive. Instead of changing the color of the framing lines V1, V2, H1 and H2, it is possible to use a cursor or the like to indicate the designated frame. In the other display modes shown in FIGS. 8 and 9, three adjacent frames or a single frame is displayed one after another in the direction designated by either of the frame designation keys 81 and 82.

In this way, the frame position data and the framing line adjustment data are written in a memory location of the memory 16a that is allocated to each frame, as shown in FIG. 5. The charge storage times Ti and the printing condition correction amounts of three colors and density are also written for each frame in the memory 16a, during the prescanning. The charge storage times Ti are written as relative values to the fixed charge storage time for the prescanning that is represented by "100". It is also possible to write the number of clock pulses to represent the charge storage time Ti. The printing condition correction amounts may be the correction amounts manually entered through the key board 51 or the correction amounts determined based on the main area photometric data in the correction amount calculator 57.

Figure 11:
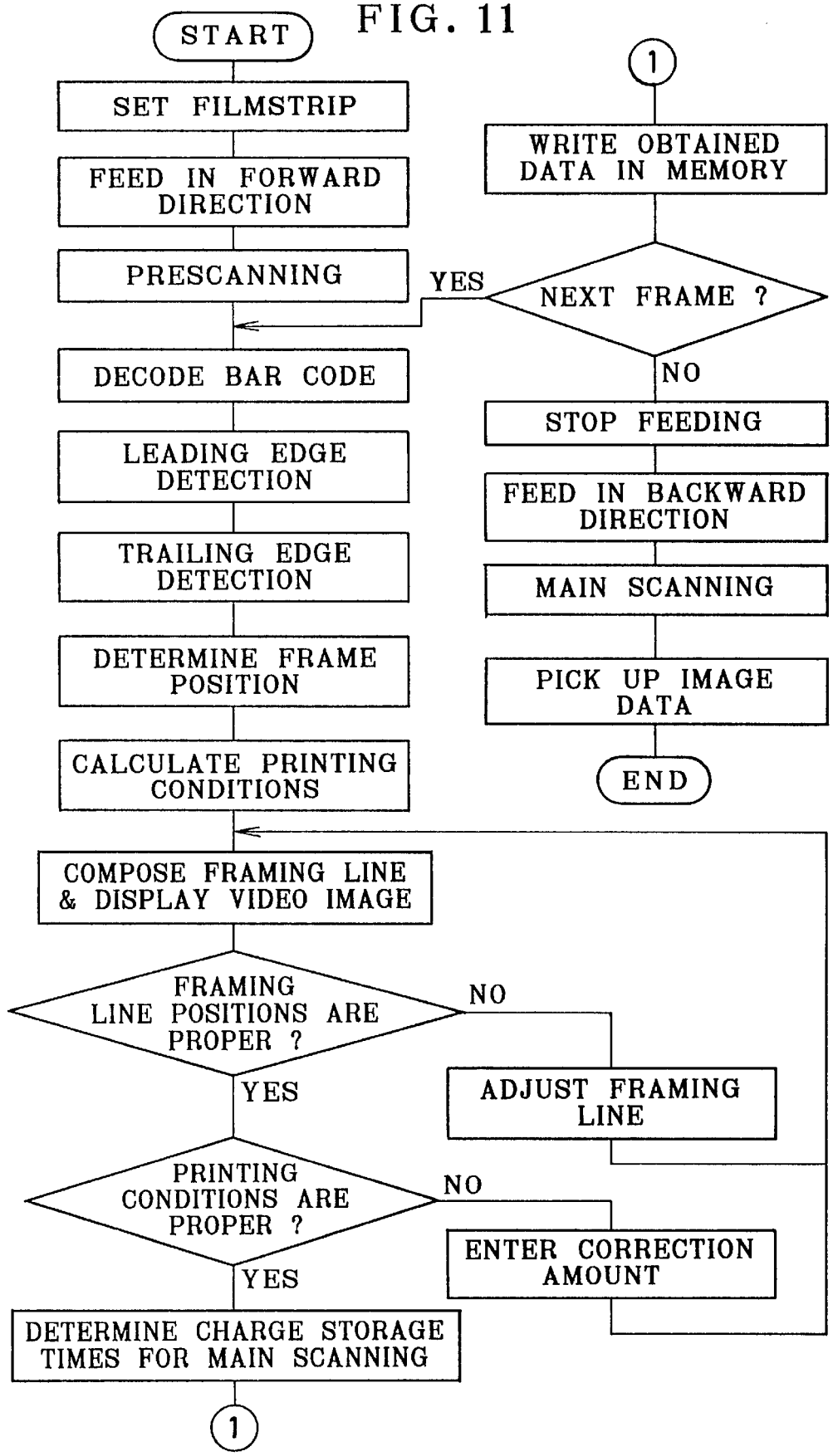
FIG. 11 is a flow chart illustrating an operation sequence of the system controller.

FIG. 11 shows the sequence of the operation of the above described film scanner. When the leading end of the negative filmstrip 10 is squeezed into between the film feed rollers 13 of the film carrier 11, the film sensor 17 detects the leading end and starts driving the motor 15 to feed the filmstrip 10 in the forward direction F. Synchronously with the film feeding, the photometric unit 22 prescans the filmstrip 10 with the fixed charge storage time. The signal processing circuit 31 groups and averages the photometric data of every 20 adjacent pixels of each line sensor 27, 28 or 29. Thus, the photometric data of 3,600 pixels per line is converted into photometric data of 180 pixels per line. Correspondingly, the pixel number is reduced in the sub-scan direction. As a result, prescan data of 180 pixels per line×260 lines is obtained for each color from the unit area of the filmstrip 10 that is defined by the length of one frame and the entire width A4 of the filmstrip 10.

The frame edge detector 36 detects a leading edge and a trailing edge of each frame based on the prescan photometric data from the signal processing circuit 31. Each time a leading edge detection signal, the system controller 16 resets the pulse counter 38 to start counting the drive pulses to the pulse motor 15. Thereafter when a start code of a succeeding frame number bar code is detected, the count of the pulse counter 38 is written as a film advance amount in the memory 16a. Thus, the distance from the leading edge to the start code of the succeeding frame number bar code is determined as the number of motor drive pulses. Since the frame number represented by this frame number bar code is written as a reference frame number in the memory 16a along with the count or the film advance amount, it is possible to identify the leading edge of each frame during the main scanning, based on the number of motor drive pulses counted from the detection of the start code of the frame number bar code that represents the reference frame number assigned to that frame. The position of the trailing edge is identified in the same way as the leading edge.

The bar code decoder 35 derives the DX bar code and the frame number bar code from the photometric data, and decodes them to determine the frame number of each frame, on the basis of detection timings of the leading and trailing edges by the frame edge detector 36 and the frame number bar code. At that time, if the frame number represented by a frame number bar code that succeeds the leading edge of a frame in the forward direction F is "12A" or "12", for instance, the frame number "12" is assigned to that frame. It is alternatively possible to determine the frame number based on the frame number bar code disposed in the middle of the frame or near the trailing edge of the frame.

The image processor 37 processes the photometric data so as to display video images 52 simulating consequent photoprints on the color CRT 54, composed with the framing lines V1, V2, H1 and H2 for framing the image pick-up range of each frame. If necessary, the operator operates the keys 81, 82 and 75 to relocate any of the framing lines V1, V2, H1 and H2 on one of the video image frames 52. If the operator determines it necessary in view of the video images, to correct the printing conditions of any of the frames, the operator operates the keys 71 to 74 to enter appropriate correction amounts. The positions of the framing lines V1, V2, H1 and H2, and/or the color balance or density of the video image are changed according to the entered data. If the operator satisfies the result of adjustment or correction, the operator operates the decision key 80 to decide the correction amounts. If not, the operator operates the keys 70 to 79 again, and the video image is corrected correspondingly.

When the decision key 80 is operated, the frame position data, i.e., the combinations of a reference frame number and a film advance amount, the printing condition correction amounts, the framing line adjustment data, and the charge storage time data are written for each frame in the memory 16a.

When the trailing end of the filmstrip 10 is detected based on the available frame number indicated by the DX bar code, and the frame number bar code data, the film feeding in the forward direction F and the prescanning operation are terminated. When all the data detected by the prescanning has been written in the memory 16a, the motor 15 is driven in the opposite direction to feed the filmstrip 10 in the backward direction B. The main scanning is carried out based on the data read out from the memory 16a frame after frame in the opposite order to the writing or the prescanning. Specifically, the image pick-up range of each frame is determined based on the frame position data and the framing line adjustment data. Next, the respective line sensors 27 to 29 main scan the image data pick-up range with the respective charge storage times that are determined based on the prescan photometric data, to obtain three color image data at the high pixel density.

During the main scanning, the signal processing circuit 31 sends the three color image data, i.e., the photometric data from the photometric unit 22, and synchronizing signals to the digital printer 60 or other external device such as a large capacity storage file. Since the main scan image data is not stored in the scanner main section 20, but is transferred to the external device as soon as it is detected, the memory capacity of the scanner main section 20 can be small. If necessary, the printing condition correction amounts are sent to the external device along with the three color image data.

The present invention facilitates obtaining high resolution image data with inexpensive line sensors, without the need for an expensive image area sensor. The line sensor permits increasing the pixel density in the primary scan direction, i.e. the pixel number per line, up to around one million with no problem. Also the pixel density in the sub scan direction, i.e. the line density, can be easily increased by moving the filmstrip relative to the line sensor at a higher speed in the sub scan direction. In comparison, the pixel density of the image area sensor is limited to at most about 1,000×2,000 pixels.

Since the pixel density is reduced for the prescanning, the memory capacity for storing the prescan data can be small. The film scanner is not required to store the high resolution image data detected by the high density main scanning, so the film scanner does not need a large capacity memory, which further saves the cost of the film scanner.

Since the framing lines are displayed on each video image frame 52, it is possible to observe the frame position that is automatically determined based on the prescan data. Therefore, it is possible to prevent image data pickup errors that may be caused by frame position determination errors on the main scanning. Furthermore, since it is possible to display video images of all frames of the same filmstrip at once on the screen, any deviation of the frame positions can be found more easily.

Because the framing lines are adjustable relative to the frame on the color CRT 50, it is easy to correct the image data pick-up range even if the frame edge detector 36 fails to determine the correct position of a frame edge, or to change the size or format of the image data pick-up range. Since the designated image data pick-up range can be visually confirmed on the color CRT 50 before it is decided, the main scanning can be accomplished completely automatically.

Since the filmstrip 10 can move continuously in both directions F and B, feeding speed variation is minimized. Since the photometric conditions of the line sensors for the main scanning are determined in accordance with the photometric data of the image recording area A3 that is extracted from the prescan data, the main scanning is performed in a proper photometric dynamic range that is adjusted to the exposure condition of each frame.

Because the line sensors 27 to 29 of the photometric unit 22 scan the entire width of the filmstrip to read the frame number bar code and the DX bar code as prescan photometric data together with the frames, it is unnecessary to provide bar code sensors separately from the line sensors 27 to 29. Also, frame edge positions are detected from the prescan photometric data. By relating the timing of detection of a frame edge to the timing of detection of a frame number bar code, the frame number represented by the frame number bar code, and to the film advance amount relative to the photometric unit 22, it is possible determine the frame position based on these relationships during the main scanning. According to this method, variations in film feeding amount are not accumulated, so that the accuracy of frame position determination is improved compared with a case where the frame position relative to a line sensor is determined based merely on the film advance amount from the detection of the film leading end.

Since the video image simulating a consequent photoprint is displayed based on the prescan data, and the video image is corrected according to the manually entered correction amounts, it is possible to confirm the corrected printing conditions. Since it is possible to observe the video images of all frames of the filmstrip at once, the printing conditions of one frame can be corrected while taking the other frames into consideration. Work efficiency is improved because it is possible to inspect the image data pick-up ranges simultaneously with the printing conditions.

According to the above embodiments, the charge storage times Ti of the photometric unit 22 for the main scanning are changed depending upon the three color average densities of the prescan photometric data. However, it is possible to adjust the quantity of printing light projected from the light source 21. When the white lamp 21a is used as the single light source lamp, the light quantity can be controlled by inserting not-shown color correction filters into the printing light path. In a printer where three lamps are provided for the three colors, the voltage of each lamp may be controlled to control the light quantity from the light source. In either case, it is preferable to store a look-up table (LUT) showing a relationship between control variables and the light quantities of the three colors, and control the light quantities based on the control variable determined with reference to the LUT. The control variable is the positions of the color correction filters 16 to 18, or the lamp voltages of the respective colors.

In the above embodiment, frame position is determined based on the distance between the frame edge and the start code of the succeeding frame number bar code. But the present invention is not to be limited to this embodiment. Frame position may be determined in another way based on frame number bar code detection signals, frame edge detection signals, and film advance amount.

It is also possible to determine frame position on the basis of the DX bar code, that is, the number of detected DX bar codes, frame edge detection signals and film advance amount. It is possible to detect the number of perforations from the prescan photometric data, to determine frame position based on the perforation number, frame edge detection signals and film advance amount. In that case, the frame edges should be detected during the main scanning, to identify the frame position. As the film advance amount, the number of motor drive pulses is used to measure the distance from the frame edge to the frame number bar code. Also the distance from the frame edge to the DX bar code or the perforation may be represented by the number of motor drive pulses. Instead of using the motor drive pulses, it is possible to use a rotary encoder. Also, it is possible to count the number of pixels in the sub-scan direction during the prescanning to use for determining the frame edge positions relative to the bar codes or the perforations.

The present invention has been described with respect to the 135-type filmstrip 10, the present invention is applicable to scanning other type or format filmstrips, including that of IX 240 type film cartridge, or so-called Advanced Photo System type film cartridge. In the IX 240 type, the film leader can be advanced out of the cartridge shell by rotating the spool in an unwinding direction, and the filmstrip has one perforation per frame. Therefore, the frame position can be determined based on the perforations. Although the above embodiment sets the filmstrip 10 one by one in the film carrier 11, the present invention is applicable to scanning an elongated web of spliced filmstrips.

It is also possible to feed the filmstrip or the spliced filmstrips twice in the same direction for prescanning and then for main scanning by use of the same film carrier. Thereby, the variations in feeding amount will be reduced.

In the above embodiment, the filmstrip moves in the sub-scan direction, while the line sensors are fixed. But it is possible to move line sensors in the sub-scan direction along a stationary filmstrip, and feed the filmstrip intermittently by the unit length corresponding to one frame. It is further possible to use a movable mirror or the like in a stationary photometric unit to sub-scan each unit length of the filmstrip while it pauses. Also in this case, the filmstrip should be intermittently fed by the unit length.

The present invention is applicable to scanning half-size frames or those filmstrips having differently sized frames, e.g. panoramic-size frames and high-vision size frames. In that case, the frame having a different size from the ordinary full-size frame can be observed on the color CRT 50, so that it is possible to adjust the framing lines V1, V2, H1 and H2 to the different size by operating the framing line adjustment keys 75. It is alternatively possible to store framing line data for each of those different frame sizes so as to display specific framing lines that are already adapted to the designated different size. It is also possible to use such specific framing lines for a full-size frame to designate a specific size image data pick-up range, e.g. a panoramic-size image data pick-up range, within the full-size frame. This embodiment is preferably for IX 240 type filmstrip that has a magnetic recording layer to record print format data thereon for designating a printing range to each frame that is all recorded in full-size.

Instead of relocating the framing lines, it is possible to relocate the video image itself to adjust the image data pick-up range. It is not always necessary to make the four framing lines adjustable, but it is possible to fix the positions of the horizontal lines relative to the video image frame. The framing lines may be replaced by another kind of marks. For example, triangular marks indicating four corners of an image data pick-up range can be useful.

It is possible to determine the photometric conditions of the line sensors for each frame during the main scanning in accordance with those photometric data pieces which belong to the image data pick-up range of that frame. It is also possible to determine the photometric conditions of the line sensors for the main scanning on the basis of the same data as used for determining the printing conditions.

Although the film scanner shown in the drawings has the color CRT as a monitoring device, it is possible to omit the monitoring device if it is unnecessary to observe and correct the printing conditions and the image data pick-up ranges on the side of the film scanner, e.g., if the film scanner is used in combination with an external device or a photo-printer that has a monitoring system and a printing condition correcting device.

Although the above embodiment uses a single photometric unit for both the prescanning and the main scanning, it is possible to provide separate photometric devices for prescanning and for main scanning. The photometric unit shown in the drawings uses dichroic mirrors to separate the light from the image forming lens into three colors. Alternatively, it is possible to use a commercially available color line sensor device wherein three line sensors are arranged in a plane and are overlaid with three color filters, respectively, so that no dichroic mirror is necessary.

Thus, the present invention should not be limited to the above described embodiments but, on the contrary, various modification may be possible to those skilled in the art without departing from the scope of claims attached hereto.

What is claimed is:

1. A film scanner for scanning color photo film having a plurality of frames recorded thereon, a film scanner comprising:

three color line sensors which make prescanning for detecting photometric data from the photo film under predetermined photometric conditions, and main scanning for detecting three color image data from the photo film;

a moving device for moving the photo film relative to the line sensors twice in a sub scan direction perpendicular to a primary scan direction of the line sensors, first for the prescanning and second for the main scanning; and a photometric condition modifying device for modifying photometric conditions of the line sensors for each frame during the main scanning in accordance with the photometric data of each frame detected through the prescanning.

2. A film scanner as claimed in claim 1, wherein the three color image data is detected at a higher pixel density than the photometric data.

3. A film scanner as claimed in claim 2, wherein the moving device moves the photo film at a higher speed for the prescanning than for the main scanning.

4. A film scanner as claimed in claim 1, further comprising a display device for displaying color video images simulating photo-prints of the respective frames based on the photometric data.

5. A film scanner as claimed in claim 4, further comprising a printing condition determination device for determining printing conditions for each frame based on the photometric data, wherein the display device displays the color video image so as to reflect the printing conditions determined by the printing condition determination device.

6. A film scanner as claimed in claim 5, wherein the printing condition determination device comprises a main area extracting device for extracting a main area of each frame from the photometric data, to determine the printing conditions based on those data pieces of the photometric data which belong to the main area.

7. A film scanner as claimed in claim 5, further comprising an manually operable correction amount entering device for entering printing condition correction amounts for each frame that can be determined in view of the color video image, wherein the printing condition determination device corrects the printing conditions with the printing condition correction amounts, and the display device corrects the color video image in correspondence with the corrected printing conditions.

8. A film scanner as claimed in claim 4, wherein the display device can display the color video images of all frames of one filmstrip in rows on a screen simultaneously with the prescanning being made by the line sensors.

9. A film scanner as claimed in claim 2, further comprising:
- a frame edge detection device for detecting edges of each frame based on the photometric data;
- a frame position determination device for detecting frame position data of the respective frames based on edge detection signals from the frame edge detection device; and
- an image data pick-up range determination device for determining an image data pick-up range of each frame based on the frame position determined by the frame position determination device, wherein the main scanning device detects the three color image data from the image data pick-up range.

10. A film scanner as claimed in claim 9, wherein the photo film is provided with at least a frame number bar code on one side of each frame, the photometric data is detected from across an entire width of the photo film, and the position determination device derives frame number bar code data from the photometric data, to detect the frame position data as a combination of the frame number bar code data, detection timings of the frame number bar code and the frame edge detection signal, and an amount of movement of the photo film relative to the line sensors in a time period between the detection timings.

11. A film scanner as claimed in claim 9, wherein the moving device reciprocates the photo film relative to the line sensors, such that the prescanning is made while the photo film moves forward, and the main scanning is made while the photo film moves backward.

12. A film scanner as claimed in claim 9, further comprising:
- a display device for displaying color video images simulating photo-prints of the respective frames based on the photometric data and for displaying marks indicating the image data pick-up range on each of the color video images; and
- a mark adjusting device for adjusting relative positions of the marks to each color video image in accordance with adjustment data; and
- a manual data input device for entering the adjustment data with reference to the color video image and the marks on the display device.

13. A film scanner for scanning color photo film having a plurality of frames recorded thereon, a film scanner comprising:
- three color line sensors which make prescanning for detecting photometric data from the photo film under predetermined photometric conditions at a predetermined pixel density, and main scanning for detecting three color image data from the photo film at a higher pixel density than the prescanning;
- a moving device for moving the photo film relative to the line sensors twice in a sub scan direction perpendicular to a primary scan direction of the line sensors, first for the prescanning and second for the main scanning;
- a photometric condition modifying device for modifying photometric conditions of the line sensors for each frame during the main scanning in accordance with the photometric data of each frame detected through the prescanning;
- a frame edge detection device for detecting edges of each frame based on the photometric data;
- a frame position determination device for determining respective frame positions on the photo film based on frame edge detection signals from the frame edge detection device;
- an image data pick-up range determination device for determining an image data pick-up range of each frame based on the frame position determined by the frame position determination device;
- a display device for displaying color video images simulating photo-prints of the respective frames based on the photometric data, and for displaying marks indicating the image data pick-up range on each of the color video images; and
- a correcting device for correcting the image data pick-up range for each frame by adjusting positions of the marks relative to each color video image on the display device in accordance with manually entered adjustment data.

14. A film scanner as claimed in claim 13, wherein the photo film is provided with at least a frame number bar code on one side of each frame, the photometric data is detected from across an entire width of the photo film, and the position determination device derives frame number bar code data from the photometric data, to detect the frame position data as a combination of the frame number bar code data, detection timings of the frame number bar code and the frame edge detection signal, and an amount of movement of the photo film relative to the line sensors in a time period between the detection timings.

15. A film scanner as claimed in claim 14, further comprising a printing condition determination device for determining printing conditions for each frame based on the photometric data, wherein the display device displays the color video images based on the photometric data so as to reflect the printing conditions determined for each frame.

16. A film scanner as claimed in claim 15, further comprising a device for entering printing condition correction amounts for each frame that can be determined in view of the color video image, wherein the printing condition determination device corrects the printing conditions with the printing condition correction amounts, and the display device corrects the color video image in correspondence with the printing condition correction amounts.

17. A film scanner as claimed in claim 13, wherein the moving device reciprocates the photo film relative to the line sensors, such that the prescanning is made while the photo film moves forward, and the main scanning is made while the photo film moves backward.

18. A method of scanning photo film having a plurality of frames recorded thereon, comprising the steps of:
- moving the photo film relative to three color line sensors in a sub scan direction, each line sensor being arranged to scan the photo film in a primary scan direction perpendicular to the sub scan direction;
- prescanning the photo film line after line through the line sensors for detecting photometric data under predetermined photometric conditions, while the photo film is moved in the sub scan direction;
- modifying photometric conditions of the line sensors for each frame in accordance with the photometric data;
- moving the photo film relative to the three color line sensors in the sub scan direction for a second time; and
- main scanning the photo film through the line sensors under the modified photometric conditions for detecting three color image data from each frame, while the photo film is moved in the sub scan direction for the second time.

19. A method of scanning photo film as claimed in claim 18, wherein the three color image data is detected at a higher pixel density than the photometric data.

20. A method of scanning photo film having a plurality of frames recorded thereon, comprising the steps of:

A. moving the photo film two times relative to three color line sensors in a sub scan direction, each line sensor being arranged to scan the photo film in a primary scan direction perpendicular to the sub scan direction;

B. prescanning the photo film line after line through the line sensors for detecting photometric data under predetermined photometric conditions at a predetermined pixel density, while the photo film is moved in the sub scan direction for the first time;

C. detecting edges of each frame based on the photometric data detected in step B;

D. determining respective frame positions on the photo film based on frame edge detection signals detected in step C;

E. determining an image data pick-up range of each frame based on the frame position determined in step D;

F. displaying color video images simulating photo-prints of the respective frames based on the photometric data detected in step B;

G. displaying marks indicating the image data pick-up range on each of the color video images;

H. correcting the image data pick-up range for each frame by adjusting positions of the marks relative to each color video image;

I. modifying photometric conditions of the line sensors for each frame in accordance with the photometric data detected in step B; and J. main scanning the photo film through the line sensors for detecting three color image data from the image data pick-up range of each frame under the modified photometric conditions at a higher pixel density than the photometric data in step B, while the photo film is moved in the sub scan direction for the second time.

21. A method of scanning photo film as claimed in claim 20, wherein step A comprises the steps of moving the photo film relative to the line sensors forward the sub scan direction for the first time, and backward for the second time.

22. A method of scanning photo film as claimed in claim 20, wherein charge storage times of the line sensors are changed in accordance with three color average densities of each frame in step I.

23. A method of scanning photo film as claimed in claim 20, wherein the three color image data detected at the higher pixel density is sent to an external device, without being stored.

* * * * *